US008733700B2

(12) United States Patent
Brivet et al.

(10) Patent No.: US 8,733,700 B2
(45) Date of Patent: May 27, 2014

(54) METHOD FOR INSTALLING AN INERTIAL REFERENCE UNIT IN AN AIRCRAFT, AND AIRCRAFT EQUIPPED IN THIS WAY

(75) Inventors: Valérie Brivet, Leguevin (FR); Thomas Cartereau, Saint-Nazaire (FR); Jean-Damien Perrie, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 467 days.

(21) Appl. No.: 13/077,083

(22) Filed: Mar. 31, 2011

(65) Prior Publication Data
US 2011/0253840 A1    Oct. 20, 2011

(30) Foreign Application Priority Data

Mar. 31, 2010   (FR) ..................................... 10 52423

(51) Int. Cl.
*B64C 1/00* (2006.01)
(52) U.S. Cl.
USPC ..................................................... 244/129.1
(58) Field of Classification Search
USPC ................... 244/117 R, 119, 120, 175, 129.1
See application file for complete search history.

(56) References Cited

U.S. PATENT DOCUMENTS

| | | | |
|---|---|---|---|
| 4,845,856 A | 7/1989 | Rochette | |
| 5,841,018 A | 11/1998 | Watson et al. | |
| 6,014,814 A | 1/2000 | Imbert et al. | |

FOREIGN PATENT DOCUMENTS

| | | | |
|---|---|---|---|
| EP | 0 278 825 A1 | 8/1988 | |
| FR | 2 755 760 A1 | 5/1998 | |
| FR | 2 757 281 A1 | 6/1998 | |

OTHER PUBLICATIONS

French Preliminary Search Report issued Nov. 16, 2010, in French 1052423, filed Mar. 31, 2010 (with English Translation of Categories of Cited Documents).

*Primary Examiner* — Valentina Xavier
(74) *Attorney, Agent, or Firm* — Oblon, Spivak, McClelland, Maier & Neustadt, L.L.P.

(57) ABSTRACT

The invention relates to a method for installing an inertial reference unit in an aircraft, in which: a reference unit support (1) is fixed to a structural element of the aircraft; support installation angles—in heading, roll and pitch—representative of angular errors of positioning of the reference unit support relative to an aircraft coordinate system are determined, this determination being based on the measurement of coordinates of points of a previously defined reference coordinate system and of characteristic points of the reference unit support; the said support installation angles are recorded in memory means, for the purposes of subsequent correction of data measured by the inertial reference unit. Preferably the reference coordinate system used is defined by means of targets formed on the structure of a segment of the aircraft for the purposes of joining this segment with an adjacent segment.

3 Claims, 2 Drawing Sheets

Figure 1:
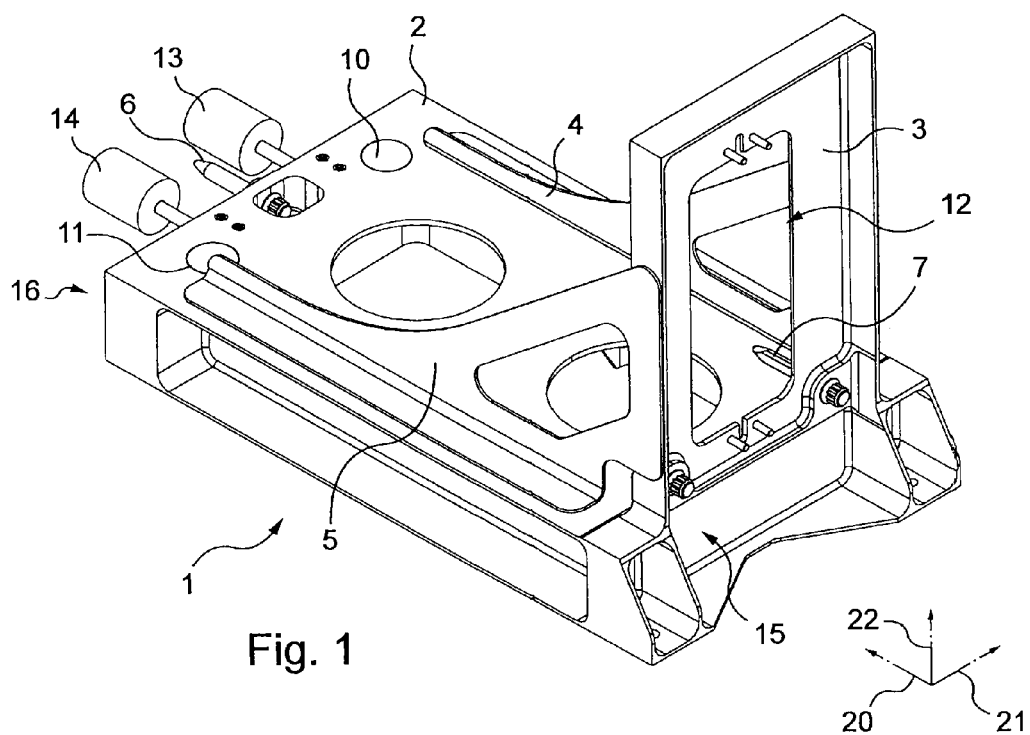

METHOD FOR INSTALLING AN INERTIAL REFERENCE UNIT IN AN AIRCRAFT, AND AIRCRAFT EQUIPPED IN THIS WAY

The present invention relates to a method for installing an inertial reference unit in an aircraft.

The attitude and heading of an aircraft are usually controlled by one or more inertial reference units, known by the acronym ADIRU ("Air Data Inertial Reference Unit"). The positioning of such an inertial reference unit within the aircraft must be extremely precise, in order to furnish correct values of attitude and heading, indispensable for completely safe operation of the aircraft.

An inertial reference unit is usually fixed to a support, known as the reference unit support, itself fixed to a structural element of the aircraft. Precise positioning of the inertial reference unit on its reference unit support can be easily achieved. The positioning errors between the inertial reference unit and its support are therefore negligible. Consequently, the exactitude of data furnished by an inertial reference unit depends substantially on the precision of adjustment of its reference unit support relative to the primary structure of the aircraft. This adjustment is usually achieved by mechanical means.

The heading adjustment of a reference unit support to its final position is achieved by means of a complex tool kit, which proves to be particularly laborious and cumbersome in the—usual—case of an aircraft equipped with three inertial reference units. In order to limit the heading alignment differences of the three inertial reference units and to guarantee a certain coherence between the data that they furnish, there is used a one-piece tool making it possible to drill holes at three separate positions (corresponding to the three reference units). This tool is provided with a calibrated metal assembly having the size of the casing of the front landing gear of the aircraft.

The large dimensions of this tool do not constitute the only disadvantage of the method currently used to adjust the heading of a reference unit support. The heading of the reference unit support is measured and adjusted relative to a reference point on a subassembly of the aircraft, which may be, for example, the nose cone and the front gear casing, or seat rails of a fuselage segment, etc. At each junction between two constituent parts of the aircraft, the manufacturing tolerances and relative positioning errors of the said parts during their assembly induce errors in the heading alignment of the inertial reference unit. The errors induced at the different junctions of parts are cumulative. It is obvious that ultimately it is extremely difficult to obtain the necessary heading precision and to retain this precision during the production of drilled holes, despite the means being employed.

The roll and pitch adjustments are made by means of an inclinometer. Furthermore, the reference unit support is equipped with four peelable shims. Depending on its position on the reference unit support, the inclinometer furnishes either a value of the roll angle or a value of the pitch angle of the reference unit support relative to a terrestrial frame of reference. A preliminary step must be employed to register the nose cone of the aircraft relative to this terrestrial frame of reference. The operator adjusts the height of the peelable shims so as to obtain the desired roll and pitch angles. This is a dichotomic, four-point method. Each modification of one shim influences the planarity of the shims and the roll and pitch adjustment of the reference unit support; therefore it necessitates new measurements and the modification of the other three shims. Such a method is particularly delicate and tedious. The search for optimization in roll and pitch may be very time-consuming. It is further obvious that it is ultimately extremely difficult under industrial conditions to achieve the precision necessary in roll and pitch (such as specified in the EIRD installation documents—"Equipment Installation Requirement Document").

The invention is intended to alleviate these disadvantages by proposing a method for installing an inertial reference unit which is simpler and faster than the known prior methods, and which ultimately makes it possible to achieve precise and reliable values of attitude and heading.

Another objective of the invention is to propose a method for installing an inertial reference unit which uses a simple tool kit that is not very cumbersome.

The invention also is intended to propose an aircraft equipped in particular with an inertial reference unit that furnishes values of attitude and heading with greater precision and reliability in comparison with known inertial reference units.

To achieve this, the invention relates to a method for installing an inertial reference unit in an aircraft, in which:

a support intended to receive the said inertial reference unit, referred to as reference unit support, is fixed to a structural element of the aircraft, angles referred to as support installation angles, representative of angular errors of positioning of the reference unit support relative to a theoretical coordinate system, referred to as aircraft coordinate system, are determined, this determination being based on the measurement of coordinates of points of a previously established reference coordinate system and of characteristic points of the reference unit support, the support installation angles determined in this way are recorded in memory means, for the purposes of subsequent correction of data measured by the inertial reference unit.

In the definition hereinabove, the terms "aircraft coordinate system" denote, in the usual way, the theoretical coordinate system formed by the theoretical roll direction (or longitudinal direction), pitch direction (wing-span direction) and heading direction (or vertical direction) of the aircraft.

The invention therefore consists in tolerating an imprecise installation of the reference unit support and in compensating for this tolerance by subsequently taking into account, during calculation of data furnished by the inertial reference unit, errors of positioning of the said reference unit support in the form of support installation angles. Since no precise adjustment of the reference unit support is performed, the installation method according to the invention is greatly simplified compared with the prior art methods. In addition to its speed of implementation, it will be noted that this method does not use any specific tool, in contrast to the prior methods, which necessitate a complex and cumbersome drilling tool, such as described in the introduction, for the heading adjustment of reference unit supports. The method according to the invention also makes it possible to dispense with the peelable shims necessary for the roll and pitch adjustments of the prior supports and that required tedious adjustment. Furthermore, the method according to the invention makes it possible ultimately to obtain more precise and more reliable attitude and heading data, which take into account the real positioning of the reference unit support relative to the aircraft coordinate system.

Preferably there are determined:

a support installation angle, referred to as heading installation angle, representative of an angular error of heading positioning of the reference unit support in the aircraft coordinate system, a support installation angle, referred to as roll installation angle, representative of an angular error of roll positioning of the reference unit support in the aircraft coordinate system, a support installation angle, referred to as pitch installation angle, representative of an angular error of pitch positioning of the reference unit support in the aircraft coordinate system.

Advantageously the reference coordinate system used is defined by means of targets formed on the aircraft structure. Preferably the targets used are targets formed on the structure of a segment of the aircraft for the purposes of joining this segment with an adjacent segment. There are used, for example, the targets formed on a segment of the nose cone of the aircraft, in particular the central segment of this nose cone. The coordinates of these targets in the aircraft coordinate system are predefined. These targets are formed on the aircraft at a station referred to as integration structure station; they define a coordinate system, referred to as integration coordinate system, which makes it possible to reproduce the positioning of the fuselage identically in other stations and especially in other assembly plants. According to the invention, this integration coordinate system is used by way of a reference coordinate system. In short, the precision in determination of support installation angles is affected only by the following imprecisions:

imprecision of positioning of the segment used (for example, the central segment of the nose cone) at the integration structure station relative to a terrestrial coordinate system, imprecision of measurement (laser) during marking and registration of targets at the installation station of the reference unit support, which station may be the integration structure station or another station, and imprecision of measurement (laser) during registration of characteristic points of the reference unit support for determination of support installation angles. The choice of integration coordinate system as a reference coordinate system according to the invention makes it possible to achieve sufficient precision in the determination of support installation angles.

Advantageously there is used a reference unit support comprising:

a platen, intended to extend substantially horizontally in the aircraft, the said platen defining a vertical direction of the support orthogonal to the platen, as well as an axial direction and a transversal direction of the support extending in the plane of the platen and intended to extend substantially parallel to the pitch and roll directions of the aircraft respectively, a rear wall extending from a rear side of the platen, at least two centering pins, one being a front pin carried by a front edge of the platen opposite the rear wall, and one being a rear pin carried by the rear wall, the said front and rear pins having axes extending in the axial direction of the support, the rear pin comprising a contact surface intended to be integrally in contact with a case of the inertial reference unit, two surfaces, referred to as contact plates, formed on the platen close to a front side of the platen opposite the rear wall, the said contact plates being spaced apart in the transversal direction of the support, the said contact plates being intended to be integrally in contact with the case of the inertial reference unit.

The aforesaid pins and contact plates form continuous lines and surfaces of contact with the case of the inertial reference unit. In other words, when the inertial reference unit is fixed on the reference unit support in its final position, its case rests on all of the contact plates, and the contact surface is in contact over its entire circumference with a bore machined in the said case.

In a first version of the invention, the characteristic points of the reference unit support, used to determine the support installation angles, are points situated on surfaces of the said support, preferably intended to be in contact with the inertial reference unit.

For example, in the case of a reference unit support such as described in the foregoing, the characteristic points are preferably the following points: a point A situated on one of the contact plates formed on the platen; a point B situated on the other contact plate formed on the platen; a point C situated on the contact surface of the rear pin; a point D situated on the front pin. The position of the said points A to D on respectively the contact plates, contact surface and front pin is immaterial, provided this position can be registered and is reproducible from one measurement to another.

Advantageously the measured coordinates of points A and B are used to determine the pitch installation angle of the reference unit support. Analogously, the measured coordinates of points B and C are preferably used to determine the roll installation angle of the said support. Finally, the measured coordinates of points C and D are advantageously used to determine the heading installation angle of the reference unit support.

In a second version of the invention, the characteristic points of the reference unit support used to determine the support installation angles are points situated on a part, referred to as an extender, which is fixed on the reference unit support and has larger dimensions than the latter.

Depending on the dimensions of the reference unit support, it is not ruled out that the distances between the aforesaid measurement points A and D are too small to obtain sufficient measurement precision and to guarantee a minimum error in determination of support installation angles. The use of such an extender is then useful: it makes it possible to increase the distance between the measurement points and consequently to improve the precision achieved in the determination of support installation angles. To this end, the interface error (relative positioning error) between the extender and the reference unit support must be negligible. This objective is easily achieved by virtue of centering pins provided on the reference unit support. The extender advantageously has guide and assembly means able to cooperate with these centering pins; in other words, the extender has, with the reference unit support, an interface that is preferably identical to that of the inertial reference unit.

Advantageously there is used an extender that has on the one hand a transversal dimension at least five times larger than the transversal dimension of the reference unit support and on the other hand an axial dimension at least two times larger than the axial dimension of the reference unit support. The terms "transversal dimension" of the support and of the extender denote the respective dimensions of these elements in the transversal direction of the reference unit support (intended in this case to be substantially parallel to the roll direction of the aircraft), the extender being observed fixed on the reference unit support. Similarly, the terms "axial dimension" of the support and of the extender denote the respective dimensions of these elements in the axial direction of the reference unit support (intended in this case to be substantially parallel to the pitch direction of the aircraft), the extender being observed fixed on the reference unit support.

Advantageously a laser device is used for measuring the coordinates of points of the reference coordinate system and of characteristic points of the reference unit support. Preferably a tracking laser and camera device is used, as well as mobile probes, each comprising a reflector and a diode array. The mobile probes are placed on the targets formed on the structure of the aircraft for registering the reference coordinate system, then on the characteristic points of the reference unit support for determination of the support installation angles.

In one possible embodiment of the invention, the memory means (in which the support installation angles are recorded) comprise at least one nonvolatile memory integrated into a centralized module of the aircraft.

As a variant, the memory means comprise at least one dedicated nonvolatile memory, this memory being preferably connected to the inertial reference unit or able to be connected to a network of the aircraft. When the aircraft is to be equipped with several inertial reference units, the memory means preferably comprise as many memories as there are inertial reference units, the installation angles of all of the reference unit supports preferably being stored in each of these memories. This redundancy guarantees a high level of safety. However, the possibilities of recording the installation angles of a support in only one memory or of providing only one memory for recording the installation angles of all of the supports are not ruled out.

In addition, an advantageous means of storage in internal memory is downloading from a module external to the aircraft.

During use, the installation angles of each support recorded in the memory means are transmitted (by virtue of a data exchange protocol or by downloading) to the corresponding inertial reference unit, in order that the said inertial reference unit can consequently correct the data measured by the inertial reference unit before any use of these data.

The present invention extends to an aircraft comprising a reference unit support and an inertial reference unit installed according to a method according to the invention. In particular, the invention relates to an aircraft comprising at least one inertial reference unit and a reference unit support fixed to a structural element of the aircraft, characterized in that it comprises, for each inertial reference unit:
- memory means in which there are recorded angles, referred to as support installation angles, representative of angular positioning errors relative to a theoretical coordinate system, referred to as aircraft coordinate system, of the reference unit support corresponding to the said inertial reference unit, the said support installation angles being determined beforehand on the basis of measurement of coordinates of points of a reference coordinate system and of characteristic points of the said reference unit support,
- calculating means making it possible to calculate data, referred to as corrected data, on the basis of data measured by the inertial reference unit and corresponding support installation angles.

As explained in the foregoing, when the aircraft comprises several inertial reference units, the memory means may be centralized and comprise a nonvolatile memory in which the installation angles of different reference unit supports of the aircraft are recorded. As a variant, or in combination, each inertial reference unit is provided with its own memory means, for example installed on its support or possibly integrated into the inertial reference unit, in which means the installation angles of the corresponding support or of all of the supports are recorded.

Each inertial reference unit is provided with its own calculating means, integrated into the said inertial reference unit.

Furthermore, each reference unit support preferably comprises a platen, a rear wall and centering pins such as defined in the foregoing. In particular, the platen has two contact plates and the rear centering pin has a contact surface.

Figure 2:
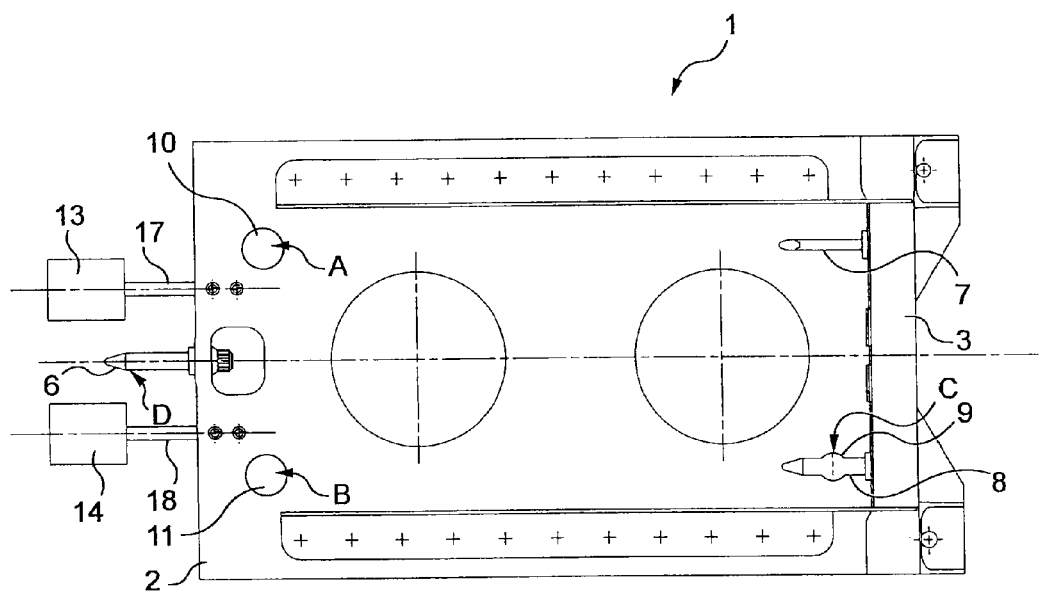
Figure 3:
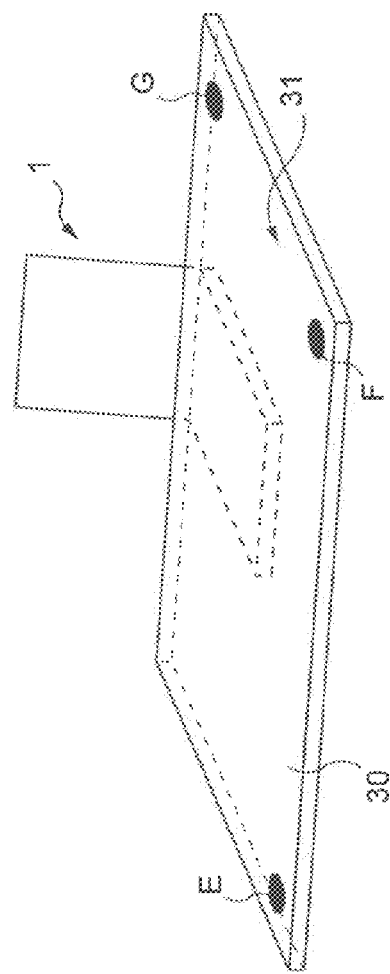
Figure 3:
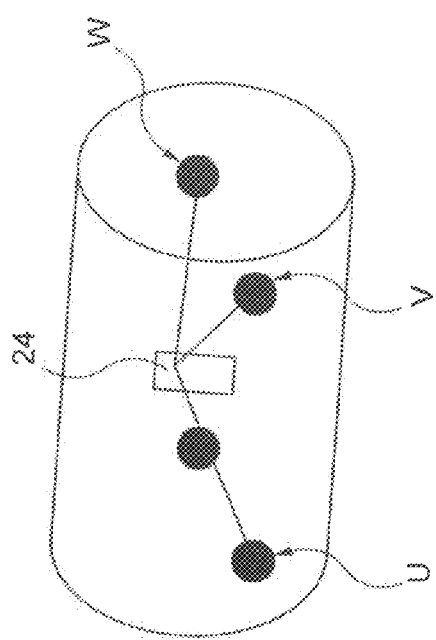

Other details and advantages of the present invention will become apparent upon reading the description hereinafter, which refers to the attached schematic drawings and relates to preferred embodiments, provided by way of non-limitative examples. In these drawings:

FIG. 1 is a perspective schematic view of a reference unit support capable of being used within the scope of an installation method according to the invention, FIG. 2 is a schematic overhead view of the reference unit support of FIG. 1, and FIG. 3 is a perspective schematic representation on the one hand of an extender capable of being used within the scope of an installation method according to the invention and on the other hand of a segment of an aircraft, the extender and the aircraft segment not being on the same scale.

FIGS. 1 and 2 illustrate a reference unit support 1 capable of being used within the scope of a method according to the invention for installing an inertial reference unit. In the usual manner, this reference unit support 1 comprises a platen 2, on which an inertial reference unit is intended to be placed, and a rear wall 3, extending orthogonally relative to platen 2 from a rear side 15 thereof.

Platen 2 has open-work design in order to limit the weight. Rear wall 3 has an opening 12 intended to receive a connector (not shown) for linking the inertial reference unit to a network for electrical supply and transfer of data of the aircraft.

Reference unit support 1 is intended to be fixed on a structural element of an aircraft by screws, not shown here, passing through platen 2. As an example of installation in an aircraft, such a reference unit support has an axial direction 20 parallel to platen 2 and coinciding with the theoretical pitch direction (also known as wing-span direction or Y axis) of the aircraft, a transversal direction 21 parallel to platen 2 and coinciding with the theoretical roll direction (also known as longitudinal fuselage direction or X axis) of the aircraft, and a vertical direction 22 orthogonal to platen 2 and coinciding with the theoretical heading direction (also known as vertical direction or Z axis) of the aircraft.

Correct positioning of the inertial reference unit relative to reference unit support 1 is assured by:
- two guide rails 4 and 5 fixed on platen 2 and extending in axial direction 20 of the reference unit support. While the inertial reference unit is being placed on reference unit support 1, these guide rails 4 and 5 permit only approximate preliminary positioning of the inertial reference unit before insertion of centering pins 6 to 8 (defined hereinafter) into the case of the inertial reference unit;
- a front centering pin 6, extending in axial direction 20 from front edge 16 of platen 2, this front pin 6 being situated substantially in the middle (in transversal direction 21) of the said front edge 16;
- two rear centering pins 7 and 8, extending in axial direction 20 above platen 2 from rear wall 3, these two rear pins 7 and 8 being spaced apart and facing one another in transversal direction 21. Rear pin 8 has a bulge 9 forming a bracing surface, in order to achieve precise adjustment of the inertial reference unit in transversal and vertical directions 21 and 22 respectively. In the present case, bulge 9 has, in a plane orthogonal to the axis of rear pin 8, a circular cross section, which divides bulge 9 into two equal parts. This bulge 9 therefore forms a contact surface in this plane, in the present case in the form of a contact circle. In one possible and preferred embodiment, bulge 9 is a spherical bush, which therefore forms a contact circle in any plane passing through its center;

two contact plates 10 and 11 in the form of disks formed on platen 2 and participating in the adjustment of the reference unit in vertical direction 22.

In parallel, the inertial reference unit has a case, provided in particular with:

a lower face intended to be placed on platen 2; contact plates 10 and 11 offer a continuous contact surface with two corresponding zones of the lower face of the case of the inertial reference unit, a front flange, which projects downward from the lower face of the case and is provided with a bore intended to receive front pin 6 of reference unit support 1. This front flange is braced against front edge 16 of platen 2 of the reference unit support when the inertial reference unit is in place on its support;

two rear bores intended to receive rear pins 7 and 8. Bulge 9 of rear pin 8 offers at least one zone of contact with the corresponding rear bore of the case of the inertial reference unit. This contact surface is normally contained in a plane substantially orthogonal to axial direction 20 (and passing through the center of the bulge).

Fixation of the inertial reference unit to reference unit support 1 is assured by two nuts 13 and 14 screwed onto threaded rods 17 and 18 extending in axial direction 20 from front edge 16 of platen 2 of the reference unit support. The front flange of the case of the inertial reference unit has two notches or bores through which threaded rods 17 and 18 are passed. In this way, nuts 13 and 14 retain the inertial reference unit by pinching its front flange.

The combination of the means described in the foregoing, sometimes referred to as interface, provided for assembly of the inertial reference unit and of reference unit support 1, makes it possible to achieve relative positioning of the reference unit and of the support in a manner sufficiently precise that it is possible to disregard any angular errors (of heading, roll and pitch) that may exist between the reference unit and its support.

On the other hand, considering the complexity of the structure of an aircraft, it is extremely difficult to achieve precise positioning of a reference unit support, such as the illustrated support 1, relative to a characteristic coordinate system of the aircraft, referred to as aircraft coordinate system (coordinate system formed by the theoretical roll direction, pitch direction and heading direction of the aircraft). The known methods for installation of inertial reference units are all intended to minimize the positioning errors (in heading, roll and pitch) of the reference unit support, so that the data furnished by the inertial reference unit are as accurate as possible.

In contrast, the method according to the invention is based on measuring and subsequently taking into account positioning errors of the reference unit support. This method takes place as follows.

Reference unit support 1 is fixed to an element of the primary structure of the aircraft by means of screws (not shown) passing through platen 2. This operation is carried out without adjustment of the support; it does not require any specific tool. In the case of an aircraft that is to be equipped with several inertial reference units, each of the reference unit supports is fixed in this way at the planned locations.

According to the invention, the angles of installation in roll, pitch and heading of each reference unit support are then determined.

The roll installation angle of a support is defined as being representative of the angular roll error of positioning of the reference unit support in the aircraft coordinate system. The roll installation angle is, for example, equal to the angle between the pitch direction of the aircraft and the projection of axial direction 20 of reference unit support 1 in a plane orthogonal to the roll direction of the aircraft.

By analogy, the pitch installation angle of a support is defined as being representative of the angular pitch error of positioning of the reference unit support in the aircraft coordinate system. The pitch installation angle is, for example, equal to the angle between the roll direction of the aircraft and the projection of transversal direction 21 of reference unit support 1 in a plane orthogonal to the pitch direction of the aircraft.

Finally, the heading installation angle of a support is defined as being representative of the angular heading error of positioning of the reference unit support in the aircraft coordinate system. The heading installation angle is, for example, equal to the angle between the roll direction of the aircraft and the projection of transversal direction 21 of reference unit support 1 in a plane orthogonal to the heading direction of the aircraft.

These installation angles are determined by measurement. According to the invention, this is accomplished by using a reference coordinate system marked on the aircraft, wherein the orientation of the axes thereof relative to the aircraft coordinate system is known, and by disregarding the imprecisions resulting from the marking and registration of this reference coordinate system. In other words, the positioning of the reference unit support (or in other words the orientation of its axial, transversal and vertical directions) in the reference coordinate system is determined by measurement, and from this the positioning of the said reference unit support in the aircraft coordinate system is deduced.

Advantageously, the reference coordinate system used is defined by targets formed beforehand, in an integration structure station, on structural elements of the aircraft, for the purposes of joining different segments of the aircraft. The coordinates of these targets in the aircraft coordinate system are predefined. The targets U, V and W of a given segment, such as that illustrated in FIG. 3, for example the central segment of the nose cone of the aircraft, make it possible to define a coordinate system referred to as integration coordinate system, used according to the invention as the reference coordinate system. The advantage of this integration coordinate system lies additionally in the fact that the direction defined by the targets V and W may be considered as being parallel (within the errors of marking and registration of targets, which errors are negligible) to the theoretical pitch direction of the aircraft, and the direction defined by the points U and V can be considered as being parallel to the theoretical roll direction of the aircraft. In other words, the integration coordinate system directly materializes the aircraft coordinate system. However, it is possible to use a reference coordinate system whose directions are not parallel to those of the aircraft coordinate system.

The measurement of the position of the reference unit supports in the integration coordinate system is carried out as follows.

A laser measuring device 24 is installed in the aircraft at a location appropriate to permit reliable sighting, on the one hand, of the targets defining the integration coordinate system and, on the other hand, of characteristic points (meaning points making it possible to define the positioning) of each reference unit support, which may be situated on the reference unit supports or on parts, referred to as extenders, mounted on these reference unit supports.

Laser measuring device 24 used is preferably a tracking-laser measuring device equipped with a high-speed camera. An operator will manually position a mobile wireless probe on each of the points whose coordinates are to be surveyed. The mobile probe comprises a reflector and a diode array whose position relative to the reflector is known. The tracking laser makes it possible to determine the exact position of the reflector, while the camera makes it possible to determine the position of the diode array in the photogram, from which the spatial orientation of the said array can be deduced. Such a laser measuring device therefore makes it possible to measure the spherical coordinates of a given point on a surface as well as the orientation of this surface. The hidden points are accessible by virtue of ball probes.

The coordinates of targets U, V and W (see FIG. 3) of the integration coordinate system are measured by means of the laser measuring device. For each reference unit support, the coordinates are also measured either for points situated on the reference unit support or for points situated on an extender mounted on the said reference unit support.

Thus, in a first version of the invention, the installation angles of each support are determined on the basis of measurement of the coordinates of points A, B, C, D (see FIGS. 1 and 2) of the said reference unit support.

Point A is a registrable point, such as the center, of contact plate 10 of the reference unit support. Point B is a registrable point, such as the center, of contact plate 11 of the reference unit support. Point C is a registrable point of the contact surface formed on bulge 9 of rear pin 8. Point D is a registrable point of front pin 6. The coordinates of all of these points in the intrinsic coordinate system of the reference unit support (defined in particular by the axial, transversal and vertical directions 20, 21 and 22 respectively) are known. The measurement of the coordinates of these points in the reference coordinate system therefore makes it possible to determine precisely the orientation of the axial, transversal and vertical directions of the reference unit support in the reference coordinate system and therefore in the aircraft coordinate system. In other words, it makes it possible to determine the support installation angles.

The roll installation angle of the support, denoted by $\alpha$, is preferably given by:

$$\alpha = \theta_2 - \theta_1$$
$$\text{with } \tan\theta_1 = \left|\frac{(Bz - Cz) - (Bzi - Czi)}{(By - Cy) - (Byi - Cyi)}\right| \text{ and } \tan\theta_2 = \left|\frac{Vz - Wz}{Vy - Wy}\right|$$

where Bz, Cz, Vz and Wz are the measured coordinates respectively of the points B, C, V and W along an axis Oz of the laser device aligned approximately with the heading direction of the aircraft, By, Cy, Vy and Wy are the measured coordinates respectively of the points B, C, V and W along an axis Oy of the laser device, orthogonal to the axis Oz aligned approximately with the pitch direction of the aircraft, Bzi and Czi are the (known) coordinates respectively of the points B and C along the axis $O_i z_i$ of the intrinsic coordinate system of the reference unit support, this axis being parallel to vertical direction 22 of the said support, and Byi and Cyi are the (known) coordinates respectively of the points B and C along the axis $O_i y_i$ of the intrinsic coordinate system of the reference unit support, this axis being parallel to axial direction 20 of the said support.

It is recalled in addition that the points V and W of the integration coordinate system are considered to be aligned in the theoretical pitch direction of the aircraft. The use of a different reference coordinate system would lead to different formulas.

The pitch installation angle of the support, denoted by $\beta$, is preferably given by:

$$\beta = \rho_2 - \rho_1 \text{ with } \tan\rho_1 = \left|\frac{Az - Bz}{Ax - Bx}\right| \text{ and } \tan\rho_2 = \left|\frac{Uz - Vz}{Ux - Vx}\right|$$

where Az, Bz, Uz and Vz are the coordinates respectively of the points A, B, U and V along the axis Oz of the laser device, and Ax, Bx, Ux and Vx are the coordinates respectively of the points A, B, U and V along an axis Ox of the laser device, orthogonal to the axes Oy and Oz.

It is recalled in addition that the points U and V of the integration coordinate system are considered to be aligned in the theoretical roll direction of the aircraft. The use of a different reference coordinate system would lead to different formulas.

The heading installation angle of the support, denoted by $\gamma$, is preferably given by:

$$\gamma = \sigma_2 - \sigma_1$$
$$\text{with } \tan\sigma_1 = \left|\frac{(Dx - Cx) - (Dxi - Cxi)}{(Dy - Cy) - (Dyi - Cyi)}\right| \text{ and } \tan\sigma_2 = \left|\frac{Vx - Wx}{Vy - Wy}\right|$$

where Dx, Cx, Vx and Wx are the coordinates respectively of the points D, C, V and W along the axis Ox of the laser device, Dy, Cy, Vy and Wy are the coordinates respectively of the points D, C, V and W along the axis Oy of the laser device, Dxi and Cxi are the (known) coordinates respectively of the points D and C along the axis $O_i x_i$ of the intrinsic coordinate system of the reference unit support, this axis being parallel to transversal direction 21 of the said support, and Dyi and Cyi are the (known) coordinates respectively of the points D and C along the axis $O_i y_i$ of the intrinsic coordinate system of the reference unit support (this axis being parallel to axial direction 20 of the said support).

It is recalled in addition that the points V and W of the integration coordinate system are considered to be aligned in the theoretical pitch direction of the aircraft. The use of a different reference coordinate system would lead to different formulas.

In a second version of the invention, the installation angles of each support are determined on the basis of measurement of coordinates of points E, F, G of an extender fixed on the reference unit support.

FIG. 3 illustrates very schematically an extender 30 mounted on a reference unit support 1. Advantageously extender 30 has an interface (not shown) with the reference unit support, which interface is identical to that (described hereinabove) of the case of the inertial reference unit intended to receive the said reference unit support. This interface makes it possible to achieve precise positioning of extender 30 relative to reference unit support 1 and therefore to disregard the relative positioning errors of these two elements. Furthermore, extender 30 has an upper face 31, which can be considered as being parallel to the plane defined by contact plates 10 and 11 of reference unit support 1 when the extender is mounted thereon.

Points E, F, G are three points registered on upper face 31 of the extender, each situated close to a corner of this upper face so that these points are spaced apart from one another as much as possible. The position of each of points E, F, G on upper face 31 is known, so that the coordinates of these points E, F, G in the intrinsic coordinate system of the reference unit support (to which the extender is fixed) are also known. The measurement of the coordinates of points E, F, G in the reference coordinate system therefore makes it possible to determine the orientation of the axial, transversal and vertical directions of the reference unit support in the reference coordinate system and therefore in the aircraft coordinate system. In other words, it makes it possible to determine the support installation angles.

Thus, for example, the roll installation angle of the support is given by:

$$\alpha = \theta_2 - \theta_1$$

$$\text{with } \tan\theta_1 = \left|\frac{Fz - Gz}{Fy - Gy}\right| \text{ and } \tan\theta_2 = \left|\frac{Vz - Wz}{Vy - Wy}\right|$$

where Fz, Gz, Vz and Wz are the measured coordinates respectively of the points F, G, V and W along the axis Oz of the laser device, and Fy, Gy, Vy and Wy are the measured coordinates respectively of the points F, G, V and W along the axis Oy of the laser device, the foregoing formulas being valid only if the points F and G are chosen (as illustrated) aligned in axial direction 20 of the reference unit support (when the extender is fixed on the said support). It is recalled that the points V and W of the integration coordinate system are considered to be aligned in the theoretical pitch direction of the aircraft. The use of a different reference coordinate system would lead to different formulas.

The pitch installation angle of the support is given by:

$$\beta = \rho_2 - \rho_1$$

$$\text{with } \tan\rho_1 = \left|\frac{Ez - Fz}{Ex - Fx}\right| \text{ and } \tan\rho_2 = \left|\frac{Uz - Vz}{Ux - Vx}\right|$$

where Ez, Fz, Uz and Vz are the coordinates respectively of the points E, F, U and V along the axis Oz of the laser device, and Ex, Fx, Ux and Vx are the coordinates respectively of the points E, F, U and V along an axis Ox of the laser device, the foregoing formulas being valid only if the points E and F are chosen (as illustrated) aligned in transversal direction 21 of the reference unit support (when the extender is fixed on the said support). It is recalled that the points U and V of the integration coordinate system are considered to be aligned in the theoretical roll direction of the aircraft. The use of a different reference coordinate system would lead to different formulas.

The heading installation angle of the support is given by:

$$\gamma = \sigma_1 - \sigma_1$$

$$\text{with } \tan\sigma_1 = \left|\frac{Fx - Gx}{Fy - Gy}\right| \text{ and } \tan\sigma_2 = \left|\frac{Vx - Wx}{Vy - Wy}\right|$$

where Fx, Gx, Vx and Wx are the coordinates respectively of the points F, G, V and W along the axis Ox of the laser device, and Fy, Gy, Vy and Wy are the coordinates respectively of the points F, G, V and W along the axis Oy of the laser device, the foregoing formulas being valid only if the points F and G are chosen (as illustrated) aligned in axial direction 20 of the reference unit support (when the extender is fixed on the said support). It is recalled that the points V and W of the integration coordinate system are considered to be aligned in the theoretical pitch direction of the aircraft. The use of a different reference coordinate system would lead to different formulas.

The use of such an extender makes it possible to minimize the imprecision resulting from the measurement of the coordinates of characteristic points of the reference unit support.

In fact, if it is considered that the laser device has a sighting precision of ±0.25 mm, the measurement of the coordinates of characteristic points of the reference unit support induces the following error $\epsilon_1$ in the determination of the roll installation angle of the support:

$$\tan\epsilon_1 = \frac{0.5}{2 \times [BC]}$$

when the installation angle is determined with points B and C of the reference unit support, and $$\tan\epsilon_1 = \frac{0.5}{2 \times [FG]}$$

when the installation angle is determined with points F and G of the extender.

Since the distance [FG] is by definition larger than the distance [BC], the error $\epsilon_1$ is minimized by virtue of the use of the extender. Taking the usual dimensions of reference unit supports into account, it is advantageous to use an extender whose upper face 31 has an axial dimension (dimension in axial direction 20 of the reference unit support when the extender is fixed on the said support) that is at least two times larger than the axial dimension of platen 2 of the reference unit support, the points F and G being situated close to the axial sides of the said upper face (sides extending in transversal direction 21).

By analogy, the measurement of the coordinates of characteristic points of the reference unit support induces the following error $\epsilon_2$ in the determination of the pitch installation angle of the support:

$$\tan\epsilon_2 = \frac{0.5}{2 \times [AB]}$$

when the installation angle is determined with points A and B of the reference unit support, and $$\tan \varepsilon_2 = \frac{0.5}{2 \times [EF]}$$

when the installation angle is determined with points E and F of the extender.

Since the distance [EF] is by definition larger than the distance [AB], the error $\varepsilon_2$ is minimized by virtue of the use of the extender. Taking the usual dimensions of reference unit supports into account, it is advantageous to use an extender whose upper face 31 has a transversal dimension (dimension in transversal direction 21 of the reference unit support when the extender is fixed on the said support) that is at least five times larger than the transversal dimension of platen 2 of the reference unit support, the points E and F being situated close to the lateral sides of the said upper face (sides extending in axial direction 20).

Finally, the measurement of the coordinates of characteristic points of the support induces the following error $\varepsilon_3$ in the determination of the heading installation angle of the reference unit support:

$$\tan \varepsilon_3 = \frac{0.5}{2 \times [CD]}$$

when the installation angle is determined with points C and D of the reference unit support, and $$\tan \varepsilon_3 = \frac{0.5}{2 \times [FG]}$$

when the installation angle is determined with points F and G of the extender.

Since the distance [FG] is by definition larger than the distance [CD], the error $\varepsilon_3$ is minimized by virtue of the use of the extender. The use of an extender whose axial dimension is at least two times larger than the axial dimension of the reference unit support (see paragraph about the error $\varepsilon_1$) is entirely satisfactory.

It should be noted that the determination of the installation angles of each support is affected by the following imprecisions:
- imprecision of positioning of the central segment of the nose cone at the integration structure station relative to a terrestrial frame of reference,
- imprecision of measurement (laser) during marking and registration of targets at the installation station of the reference unit support. For the roll and heading installation angles, this imprecision, denoted by $\varepsilon_4$ is given by tan $\varepsilon_4$=1/[VW]. For the pitch installation angle, this imprecision, denoted by $\varepsilon_5$ is given by tan $\varepsilon_5$=1/[UV];
- imprecision of measurement (laser) $\varepsilon_1$ or $\varepsilon_2$ or $\varepsilon_3$ defined hereinabove, during registration of characteristic points of the reference unit support.

The invention makes it possible to satisfy the normative requirements in force in the matter of precision and reliability of data furnished by the inertial reference units. Furthermore, an inertial reference unit installed according to the invention furnishes data with improved precision and reliability compared with the prior reference units installed according to the known methods. This favorable result complements the major advantage of the installation method according to the invention, namely the simplicity and speed with which it can be employed.

Once the installation angles of each reference unit support have been determined as explained in the foregoing, they are recorded in memory means. These memory means may comprise at least one nonvolatile memory integrated into a centralized module of the aircraft and/or at least one nonvolatile memory installed, for example, on one or on each of the reference unit supports, as well as an internal means of memory storage by downloading. In the case in which each reference unit support is equipped with a nonvolatile memory, it is possible to record the installation angles of all of the reference unit supports in each memory or else to record only the installation angles of the respective support in each memory.

Regardless of the nature of the memory means (centralized module of the aircraft or dedicated memories), linking means are advantageously provided between these memory means and the inertial reference units for the purposes of transmitting, to each inertial reference unit, the installation angles of the corresponding support (and if necessary the installation angles of the other supports). In the case of centralized memory means, the support installation angles are transmitted to the inertial reference units by the central communication network of the aircraft, to which the inertial reference units are connected. In the case of distributed memory means, each memory installed on its reference unit support, for example, is connected by a dedicated cable to the inertial reference unit carried by the said support.

In the case of storage in internal memory in the inertial reference unit, transmission by downloading may be achieved via the network in dedicated data packets.

The installation angles of each support stored in memory in this way are then used by a centralized calculating module of the aircraft or preferably by the inertial reference unit carried by the said support to correct, in real time, the data that this reference unit is measuring. This correction makes it possible to compensate for defects in positioning of the said support relative to the aircraft structure.

The invention may be made the object of numerous variants relative to the illustrated embodiment, provided these variants fall within the scope defined by the claims.

As demonstrated in the foregoing, three points of the extender are sufficient to determine the installation angles in roll, pitch and heading of the reference unit support. Nevertheless, it is possible to use four points of the extender, preferably registered at the four corners of its upper face, such as the points E, F and G illustrated in FIG. 3, and an additional point H. In this case, to determine the installation angle in roll, it is possible to use either the points F and G (as explained in the foregoing) or the points E and H. To determine the installation angle in pitch, it is possible to use either the points E and F (as explained in the foregoing) or the points H and G. To determine the installation angle in heading, it is possible to use either the points F and G (as explained in the foregoing) or the points E and H.

Conversely, it is proposed in the illustrated example to use four characteristic points A, B, C, D situated on the reference unit support. However, three points situated on the reference unit support are sufficient to determine the support installation angles.

It should be noted that the points A, B, C, D were chosen because they are at the interface between the inertial reference unit and the reference unit support and consequently they make it possible to define directly the positioning of the inertial reference unit itself in the aircraft coordinate system with great precision (within the errors, which are negligible, of positioning of the inertial reference unit relative to the reference unit support). In particular, the points A and B, because they are spaced apart in transversal direction 21 of the reference unit support (approximately parallel to the roll direction of the aircraft), and they constitute stops for the inertial reference unit in the vertical direction, make it possible to define with precision any angle by which the inertial reference unit may be rotated around the pitch direction relative to a horizontal plane of the aircraft. The points B and C, because they are spaced apart in axial direction 20 of the reference unit support (approximately parallel to the pitch direction of the aircraft), and they constitute stops for the inertial reference unit in the vertical direction, make it possible to define with precision any angle by which the inertial reference unit may be rotated around the roll direction relative to a horizontal plane of the aircraft. The points C and D, because they are spaced apart in axial direction 20 of the reference unit support (approximately parallel to the pitch direction of the aircraft), and they constitute stops for the inertial reference unit in transversal direction 21 of the reference unit support (approximately parallel to the roll direction), make it possible to define with precision any angle by which the inertial reference unit may be rotated around the heading direction relative to a longitudinal vertical plane of the aircraft.

That being the case, other points may be chosen, including reference unit support points that do not belong to the interface between the reference unit support and the inertial reference unit, provided the position (or in other words the coordinates) of these points in the intrinsic coordinate system of the reference unit support is known and provided as a consequence they make it possible to characterize, for example, the axial, transversal and vertical directions of the reference unit support.

The invention claimed is:

1. An aircraft comprising at least one inertial reference unit and a reference unit support fixed to a structural element of the aircraft, wherein the aircraft comprises, for each inertial reference unit:
    a memory including recorded support installation angles representative of angular positioning errors relative to an aircraft coordinate system of the reference unit support corresponding to said inertial reference unit, said support installation angles being determined beforehand on a basis of measurement of coordinates of points of a reference coordinate system and of characteristic points of said reference unit support; and
    calculating module to calculate corrected data on a basis of data measured by the inertial reference unit and corresponding support installation angles, wherein each reference unit support comprises:
        a platen to extend substantially horizontally in the aircraft, said platen defining a vertical direction of the support orthogonal to the platen, an axial direction and a transversal direction of the support extending in a plane of the platen and to extend substantially parallel to the pitch and roll directions of the aircraft respectively;
        a rear wall extending from a rear side of the platen;
        at least two centering pins, one of the centering pins being a front pin carried by a front edge of the platen opposite the rear wall, and another one of the centering pins being a rear pin carried by the rear wall, said front and rear pins having axes extending in the axial direction of the support, the rear pin comprising a contact surface to be integrally in contact with a case of the inertial reference unit; and
        two contact plates formed on the platen close to a front side of the platen opposite the rear wall, said contact plates being spaced apart in the transversal direction of the support, said contact plates being integrally in contact with the case of the inertial reference unit.

2. An aircraft according to claim 1, wherein at least one an extender is fixed on the reference unit support and has larger dimensions than the reference unit support.

3. An aircraft according to claim 2, wherein the extender includes a transversal dimension at least five times larger than a transversal dimension of the reference unit support and an axial dimension at least two times larger than an axial dimension of the reference unit support.

* * * * *

UNITED STATES PATENT AND TRADEMARK OFFICE
CERTIFICATE OF CORRECTION

PATENT NO. : 8,733,700 B2
APPLICATION NO. : 13/077083
DATED : May 27, 2014
INVENTOR(S) : Brivet et al.

It is certified that error appears in the above-identified patent and that said Letters Patent is hereby corrected as shown below:

In the Specification

Column 11, line 65, replace formula from "$\gamma = \sigma_1 - \sigma_1$" to --$\gamma = \sigma_2 - \sigma_1$--.

Signed and Sealed this
Ninth Day of December, 2014

Michelle K. Lee
*Deputy Director of the United States Patent and Trademark Office*